April 10, 1951  G. A. SIVLEY  2,547,982
GRIDDLE SUSPENDING AND ACTUATING MECHANISM
Filed July 7, 1947
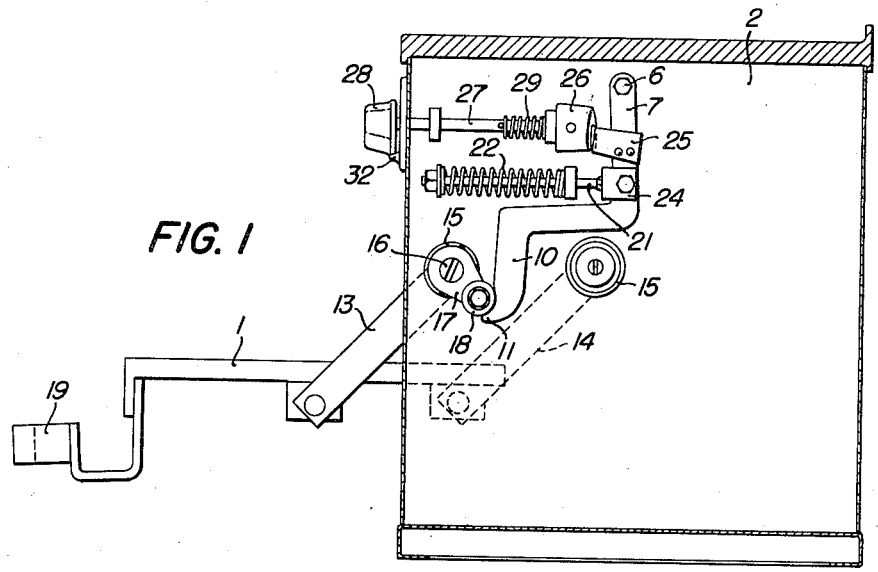
FIG. 1
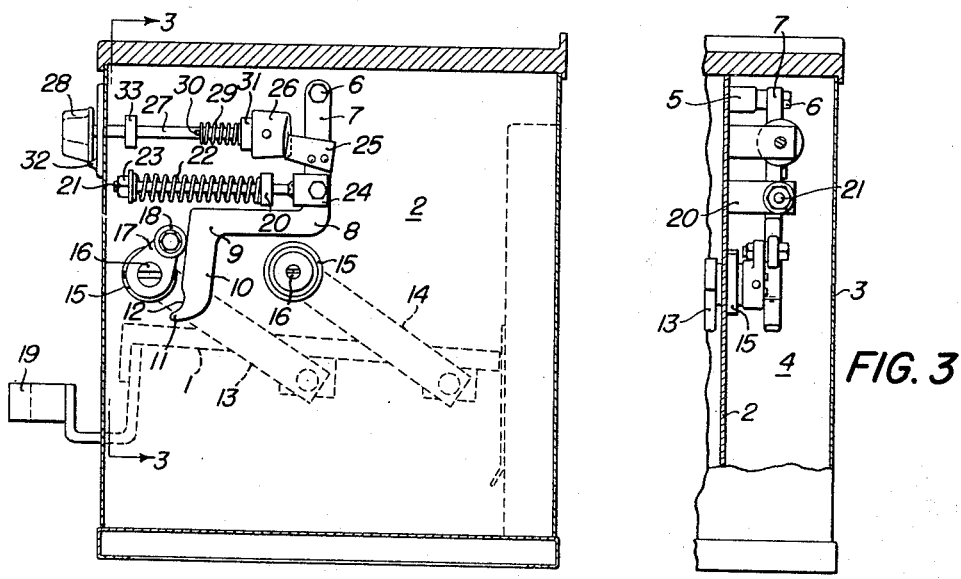
FIG. 2
FIG. 3
INVENTOR.
G. A. SIVLEY
BY
Merrill M. Blackburn
ATTORNEY Patented Apr. 10, 1951

2,547,982

UNITED STATES PATENT OFFICE 2,547,982

GRIDDLE SUSPENDING AND ACTUATING MECHANISM

Garland A. Sivley, Quakertown, Pa., assignor of three-fourths to Ernest Reich, Forest Hills, N. Y.

Application July 7, 1947, Serial No. 759,428

10 Claims. (Cl. 99—427)

My present invention relates to improvements in cooking apparatus and more particularly to improvements in operating means for a griddle movable into and out of a cooking chamber. Among the objects of this invention are the provision of an improved means for raising a griddle of the type indicated to its upper limit of motion, both inside and outside of a cooking chamber; the provision of improved means for adjusting the upper limit of motion of a griddle within the cooking chamber; the provision of improved means for limiting the upward motion of the griddle outside of the cooking chamber; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a vertical transverse section through the right hand end of a stove embodying my invention, exposing the operating mechanism for the griddle in the cooking chamber;

Fig. 2 is a view similar to Fig. 1 with the griddle retracted into the cooking chamber; and Fig. 3 is a fragmentary view of an end portion of the stove with the front broken away and represents a section substantially along the plane represented by the line 3—3, Fig. 2.

Reference will now be made in greater detail to the annexed drawings for a more complete description of this invention, which may be applied to a wide or narrow stove having a square or oblong griddle, the stove being of a type similar to that shown in my Patent No. 2,362,415, issued November 7, 1944. As shown in Fig. 5 of that patent, the griddle may be swung out of the cooking compartment or, as shown in Fig. 6, swung back into it. The details of this action are not involved in the present construction which is concerned, rather, with the mechanism for holding the griddle at the upper limits of its travel, either inside of the cooking compartment or outside thereof. The structure for accomplishing this end will now be described in detail.

As in the case of the patent referred to above, the stove has a cooking compartment in which the griddle 1 is located during a cooking operation. This cooking compartment has heat resistant end walls 2, preferably of steel or cast iron and, spaced from these, finish walls 3 of sheet metal, such as stainless steel or a base metal plated with chromium. These are merely suggestions and are not to be regarded as limitations. Between the end walls 2 and 3 are compartments 4 in which the operating mechanism for the griddle may be located. On an end wall 2 is formed or secured a stud 5 having an internally threaded aperture for the reception of the bolt 6 which passes through the end of a lever 7 and supports this pivotally with relation to the stud 5. This lever 7 extends downwardly to a bend 8, and from there substantially horizontally to a bend 9, from which extends downwardly an arm 10, terminating in a stop 11, between which and the arm 10 is a notch or depression 12, the purpose of which will appear presently.

As in the above identified patent, there are links 13 and 14 which suspend the griddle 1 either inside or outside of the cooking compartment. Ball bearings 15, on the wall 2, inside of the compartment 4, support the pivot members 16 about which the links 13 and 14 turn. A crank arm 17 is rigidly connected to the link 13 by the outer pivot member 16, and this crank arm therefore turns with and maintains a constant angle with the link 13. On the free end of the crank arm 17 is mounted a roller 18 by means of a stud and ball bearing. This permits free rolling of the roller 18 on the surface of the arm 10. Therefore, when pressure is exerted downward on the handle 19 and the same is pulled forwardly, the griddle will move from the position shown in Fig. 2 to that shown in Fig. 1, and the crank arm 17 will move with the link 13, carrying the roller 18 into the notch or depression 12, its travel being stopped by the stop 11.

A lug 20 is formed on or secured to the wall 2 and has a bolt 21 extending therethrough, which bolt is surrounded by a coil spring 22, one end of which abuts against the lug 20 and the other against a stop means 23, preferably consisting of a nut and washer. The nut may be adjusted on the bolt 21 for adjusting the pressure of the spring 22 and varying the pressure of the arm 10 against the roller 18. This varies the holding effect on the links 13 and 14 and the griddle 1, tending to hold the latter in its elevated position, either inside or outside of the cooking compartment. The bolt 21 is connected to the lever 7 by a yoke 24, through which force is transmitted from the spring 22 to the lever 7 for the support of the griddle.

A bracket 25 is mounted on the lever 7 and bears at one end against the spiral cam 26 secured to one end of shaft 27, the other end of which extends out to the front of the stove and carries the handle 28, by means of which the shaft 27 and cam 26 are turned. Turning of the cam 26 adjusts the position of the lever 7 and, more particularly, the arm thereof. Adjusting the position of this arm 10 adjusts the upper limit of movement of griddle 1 inside of the cooking compartment. The spring 29, bearing at one end against the pin 30 and at the other end against the bracket 31 on the end wall 2, tends to prevent the cam 26 from getting out of adjusted position. A lug 32 on the front of the stove is engaged by the handle 28 and limits the amount which the shaft 27 may be turned, thus preventing the end of the bracket 25 from dropping into the stepcut upon the end face of the cam 26, which would tend to give the griddle 1 a sudden upward thrust. There is a second bracket 33 on the face of the end wall 2, and the shaft 27 passes through the two brackets 31 and 33 and is held in place thereby.

There are modifications in the shape and positioning of parts which can be resorted to without departing from the spirit of this invention or the scope of the appended claims. There are several modifications which might be made within the scope of the present invention and I therefore wish the present disclosure to be construed as merely illustrative of the present inventive idea.

It is believed that the operation of the mechanism disclosed has been sufficiently explained in the foregoing specification, but it will be summarized as follows. When a downward pressure and pull are exerted on the handle 19, it causes the griddle 1 to be moved downwardly from the position shown in Fig. 2 to that shown in Fig. 1, its forward motion being stopped by the roller 18 entering the notch or depression 12 and engaging the stop 11. Reverse pressure causes reverse action, the roller 18 forcing the arm 10 backwardly and turning the lever 7 about its pivot 6. When the links 13 and 14 pass a vertical position, the spring 22, acting through the bolt 21, pulls the lever forwardly and causes the griddle 1 to be lifted to its upper limit, as determined by the position of the cam 26.

Having now described my invention, I claim:

1. A stove griddle and operating mechanism therefor comprising substantially parallel suspending links pivotally connected to the griddle for suspending it either within or outside of a stove, said links having pivot members adapted to connect them to and pivotally supporting them upon a stove wall, said links acting as a parallel linkage mechanism for supporting the griddle during its movements into and out of the stove, the supporting pivot of one of said links having a crank arm rigidly connected thereto and arranged at an angle with reference to the said link, said crank arm having a roller on its moving end, a lever adapted to be pivotally mounted on the stove wall at a distance from said pivot members and having one of its ends extending into proximity to the roller, said lever having a notch formed therein for engagement by said roller to hold the links and the griddle supported thereby in a definite position outside of the stove, and spring means for holding the lever against said roller.

2. In a stove structure having a grilling opening, a griddle for suspension therein, links for suspending the griddle, and a wall by which the links are supported to swing in a substantially vertical direction; a lever pivotally supported on said wall to swing in a substantially vertical direction, spring means for controlling the swinging of said lever, and a crank rigidly connected to one of said links and extending into the path of the lever and adapted to be engaged thereby, said lever, crank, and links cooperating to support the griddle within or outside of the stove.

3. In a stove structure having an internal cooking space provided with an end wall and the stove having an enclosed space beyond said end wall, a griddle within said cooking space, and approximately parallel linkage mechanism pivotally mounted on said end wall; the combination of a lever pivotally mounted on said end wall and extending into proximity to the linkage mechanism, a fixed abutment on said end wall, a spring outside of said wall acting against said abutment and connected to said lever to swing it in one direction, a crank fixedly connected to one of the links and extending into a position to engage said lever, and a stop on the lever to engage the crank and limit the distance the griddle may move out of the cooking space.

4. In a stove structure having an internal cooking space provided with an end wall and the stove having an enclosed space beyond said end wall, a griddle within said cooking space, and approximately parallel linkage mechanism pivotally mounted on said end wall; the combination of a lever pivotally mounted on said end wall and extending into proximity to the linkage mechanism, a fixed abutment on said end wall, a spring outside of said wall acting against said abutment and connected to said lever to swing it in one direction, a crank fixedly connected to one of the links and extending into a position to engage said lever, a stop on the lever to engage the crank and limit the distance the griddle may move out of the cooking space, and adjustable means for varying the amount which the griddle may rise in the cooking space.

5. In a structure of the type described having a griddle and links adapted to suspend a griddle for swinging movement into and out of a stove; a lever adapted to be pivotally mounted on an end wall of the stove, a crank arm rigidly connected to one of the suspending links, said crank arm turning with the links and, at its free end, engaging said lever to swing it in one direction about its pivot, spring means biasing the lever for movement in the opposite direction, and stop means for limiting the turning of the crank arm with relation to the lever.

6. In a structure of the type described having a griddle and links adapted to suspend a griddle for swinging movement into and out of a stove; a lever adapted to be pivotally mounted on an end wall of the stove, a crank arm rigidly connected to one of the suspending links, said crank arm turning with the links and, at its free end, engaging said lever to swing it in one direction about its pivot, spring means biasing the lever for movement in the opposite direction, stop means for limiting the turning of the crank arm with relation to the lever, and an adjustable means for varying the stopping point at which the griddle is stopped when entering the stove.

7. In a structure of the type described having a griddle and links adapted to suspend a griddle for swinging movement into and out of a stove; a lever adapted to be pivotally mounted on an end wall of the stove, a crank arm rigidly connected to one of the suspending links, said crank arm turning with the links and, at its free end, engaging said lever to swing it in one direction about its pivot, spring means biasing the lever for movement in the opposite direction, stop means for limiting the turning of the crank arm with relation to the lever, the lever having a horizontally projecting bracket, and a spiral cam mounted in front of said bracket for adjustment to vary the inward, upward movement of the griddle.

8. In a stove having a cooking compartment, a separate compartment, at least at one end thereof, a griddle in the cooking compartment, and suspending links for supporting the griddle upon the end walls of the stove; the combination of a lever mounted upon an end wall of the cooking compartment, spring means mounted upon said end wall and biasing the lever in one direction, and a crank arm connected to one of the suspending links and biasing the lever in the opposite direction, the crank arm having means contacting the lever and forcing it to swing against the bias of the spring means.

9. In a stove having a cooking compartment, a separate compartment, at least at one end thereof, a griddle in the cooking compartment, and suspending links for supporting the griddle upon the end walls of the stove; the combination of a lever mounted upon an end wall of the cooking compartment, spring means mounted upon said end wall and biasing the lever in one direction, a crank arm connected to one of the suspending links and biasing the lever in the opposite direction, the crank arm having means contacting the lever and forcing it to swing against the bias of the spring means, and the lever having stop means for engagement by the contacting means on the crank arm to limit the amount of turning movement in one direction of the suspending links.

10. In a stove having a cooking compartment, a separate compartment, at least at one end thereof, a griddle in the cooking compartment, and suspending links for supporting the griddle upon the end walls of the stove; the combination of a lever mounted upon an end wall of the cooking compartment, spring means mounted upon said end wall and biasing the lever in one direction, a crank arm connected to one of the suspending links and biasing the lever in the opposite direction, the crank arm having means contacting the lever and forcing it to swing against the bias of the spring means, and the lever having a depression in the edge contacted by the crank arm for engagement by the contacting means of the crank arm to hold the suspending links and the griddle against inadvertent movement.

GARLAND A. SIVLEY.

REFERENCES CITED

The following references are of record in the file of this patent:

UNITED STATES PATENTS

| Number | Name | Date |
|---|---|---|
| 874,388 | Butler | Dec. 24, 1907 |
| 1,425,501 | Maul | Aug. 8, 1922 |
| 1,895,650 | Carmean et al. | Jan. 31, 1933 |
| 1,896,850 | Perry | Feb. 7, 1933 |
| 2,106,506 | Pletcher et al. | Jan. 25, 1938 |
| 2,309,454 | Heller | Jan. 26, 1943 |
| 2,362,415 | Sivley | Nov. 7, 1944 |